US011897103B2

(12) United States Patent
Tse et al.

(10) Patent No.: US 11,897,103 B2
(45) Date of Patent: Feb. 13, 2024

(54) WORKING END FOR A NAIL DRIVING TOOL

(71) Applicants: Desmond Tse, Edmonton (CA); Tomas Walter, Edmonton (CA)

(72) Inventors: Desmond Tse, Edmonton (CA); Tomas Walter, Edmonton (CA)

( * ) Notice: Subject to any disclaimer, the term of this patent is extended or adjusted under 35 U.S.C. 154(b) by 169 days.

(21) Appl. No.: 17/486,925

(22) Filed: Sep. 28, 2021

(65) Prior Publication Data

US 2022/0184786 A1 Jun. 16, 2022

(30) Foreign Application Priority Data

Dec. 16, 2020 (CA) ...................................... 3102822

(51) Int. Cl.
*B25C 1/00* (2006.01)

(52) U.S. Cl.
CPC .................................... *B25C 1/001* (2013.01)

(58) Field of Classification Search
CPC ........... B25C 1/001; B25C 7/00; B25C 1/008; B25C 1/188; B25C 1/00
USPC .......................................... 227/107, 119, 156
See application file for complete search history.

(56) References Cited

U.S. PATENT DOCUMENTS 4,731,907 A 3/1988 Krowl
4,821,937 A 4/1989 Rafferty
5,094,380 A 3/1992 Nasiatka
5,201,449 A 4/1993 Miller
5,743,455 A 4/1998 Holliday
6,393,711 B1 5/2002 Freund
6,769,193 B1 8/2004 Meisner
6,776,322 B2 8/2004 Villela
6,824,036 B2 11/2004 Walter
7,255,256 B2 8/2007 McGee et al.
7,565,922 B2 7/2009 Buetow
7,739,807 B2 6/2010 Grant
8,056,785 B2 * 11/2011 Gosis ......................... B25C 7/00
227/19

(Continued)

FOREIGN PATENT DOCUMENTS

JP 08099275 A 4/1994
JP 2001162562 A 6/2001

OTHER PUBLICATIONS

"Roofing, Siding & Fencing Fasteners, Vinyl Siding Attachment, Item Code MA0013", SENCO Indistrial Tools 2020 product catalog, p. 51, 2020 SENCO Brands, Inc.

(Continued)

*Primary Examiner* — Jacob A Smith
(74) *Attorney, Agent, or Firm* — Nathan V. Woodruff

(57) ABSTRACT

There is provided a working end for a nail driving tool for use in installing a siding component having a nailing strip. The working end has a body with a front end, rear end, sidewall, and a nail aperture between the front end and the rear end. A first guide is formed by a recess in the front end and is configured to align the nail aperture with the nailing strip by engaging a surface of the siding component. A receptacle is formed in the rear end of the body and is configured to receive the nail driving tool. One or more protrusions on the front end are spaced from the nail aperture. The one or more protrusions are configured to engage the nailing strip and align the nail aperture with a nail-receiving aperture of the nailing strip.

23 Claims, 7 Drawing Sheets

(56) References Cited

U.S. PATENT DOCUMENTS

| | | | | |
|---|---|---|---|---|
| 8,627,991 | B2 | 1/2014 | Francis et al. | |
| D843,192 | S | 3/2019 | Reed | |
| 10,307,903 | B2 * | 6/2019 | Reed | E04F 13/18 |
| 2004/0011845 | A1 * | 1/2004 | Walter | B25C 7/00 227/120 |
| 2005/0006426 | A1 | 1/2005 | Walter | |
| 2005/0017049 | A1 | 1/2005 | Betz | |
| 2007/0215668 | A1 * | 9/2007 | Tabacco | B25C 7/00 227/107 |
| 2008/0290128 | A1 * | 11/2008 | Buetow | B25C 7/00 227/8 |
| 2015/0306754 | A1 * | 10/2015 | Pappin | B25C 1/04 227/15 |
| 2019/0275625 | A1 | 9/2019 | Weissenfels | |
| 2022/0178147 | A1 | 6/2022 | Schuss, Jr. et al. | |

OTHER PUBLICATIONS

"Construction Stapler Accessories, VSA4, Vinyl Siding Adaptor Kit", BOSTITCH Fastening Catalog, p. 26, Mar. 2018 BOSTITCH Fastening Systems.

"Senco HA0308 Siding Safety Foot" https://www.amazon.sg/Senco-HA0308-Siding-Safety-Foot/dp/B00ZZHFE4A, Jun. 12, 2015.

* cited by examiner

WORKING END FOR A NAIL DRIVING TOOL

TECHNICAL FIELD

This relates to a working end of a nail driving tool, in particular a working end that acts as a guide for installing siding on a building.

BACKGROUND

Siding is installed on the outside of a building to protect against the elements. Vinyl and other types of siding uses a nailing strip through which nails are driven to install the siding. When using a nail driving tool, it may be useful to use an alignment tool to help ensure the nail is properly positioned in the nailing strip.

U.S. Pat. No. 10,307,903 (Reed) entitled "Siding Adaptor for Nail Guns" is an example of an adaptor that is mounted on the tip of a nail gun when using the nail gun to install siding.

SUMMARY

According to an aspect, there is provided a working end for a nail driving tool for use in installing a siding component having a nailing strip comprising a series of nail-receiving slots, the working end comprising a body having a front end, a rear end opposite the front end, an outer perimeter between the front end and the rear end, and a nail aperture between the front end and the rear end, wherein the rear end comprises a connection that secures the body to the nail driving tool and aligns the nail aperture with the nail driving tool, a first guide formed by a recess in the front end that is configured to align the nail aperture with the nailing strip when engaged to a surface of the siding component that is a set distance from the nailing strip, and one or more protrusions extending from the front end spaced from the nail aperture, the one or more protrusions being configured to engage the nailing strip and align the nail aperture with a nail-receiving aperture of the nailing strip.

According to other aspects, the working end may comprise one or more of the following features, alone or in combination: the front end may have a second guide formed by a second recess in the front end, the second guide being orthogonal to the first guide; the first guide may be configured to establish a first spacing between the front end of the body and the nailing strip when engaged to the surface of the siding component; the second guide may be configured to establish a second spacing between the front end of the body and the nailing strip when engaged to the surface of the siding component; a nail driven by the nail driving tool may pass along an axis through the nail aperture; the first guide may be located at a first distance from the axis, and the second guide may be located at a second distance from the axis; the one or more protrusions may comprise first and second protrusions that are positioned along a line that intersects the axis; a distance that the one or more protrusions extend away from the front end may be adjustable; the connection may comprise a receptacle formed in the rear end of the body, a depth of the receptacle being adjustable; the receptacle may engage the nail driving tool using a friction fit or an interference fit; a thickness of the attachment body along the outer perimeter may be sized to fit within a channel of a J-channel siding element; and the working end may further comprise visual guides on the outer perimeter that are positioned to align the nail aperture with the nail-receiving aperture of the nailing strip.

According to an aspect, there is provided a method of installing siding on a building, the method comprising the steps of: providing a working end for a nail driving tool, the working end comprising: a body having a front end, a rear end opposite the front end, an outer perimeter that extends between the front end and the rear end, and a nail aperture between the front end and the rear end, the rear end comprising a connection that secures the body to the nail driving tool, a first guide formed by a recess in the front end, and one or more protrusions on the front end and spaced from the nail aperture; aligning the nail aperture with the nail driving tool; using the first guide to align the nail aperture with a nailing strip of a siding component; using the one or more protrusions to engage the nailing strip and align the nail aperture with a nail receiving aperture of the nailing strip; and using the nail driving tool, securing the siding to the building by driving one or more nails through the nail aperture and into the nailing strip.

According to other aspects, the step of using the first guide to align the nail aperture with the nailing strip may comprise engaging the first guide with a surface of the siding component; the front end may have a second guide formed by a second recess in the front end, the second guide being orthogonal to the first guide; the nails may pass along an axis through the nail aperture; the first guide may be located at a first distance from the axis, and the second guide may be located at a second distance from the axis; the first guide may be configured to establish a first spacing between the front end of the body and the nailing strip when engaged to the surface of the siding component; the second guide may be configured to establish a second spacing between the front end of the body and the nailing strip when engaged to the surface of the siding component; a distance that the one or more protrusions extend from the front end may be adjustable; the connection may comprise a receptacle formed in the rear end of the body, a depth of the receptacle being adjustable; the step of aligning the nail aperture with the nail driving tool may comprise inserting the nail-driving tool into the receptacle; the receptacle may engage the nail driving tool using a friction fit or an interference fit; a thickness of the attachment body along the outer perimeter may be sized to fit within a channel of a J-channel siding element; and the attachment may further comprising visual guides on the outer perimeter that are positioned to align the nail aperture with the nail-receiving aperture of the nailing strip.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 5:
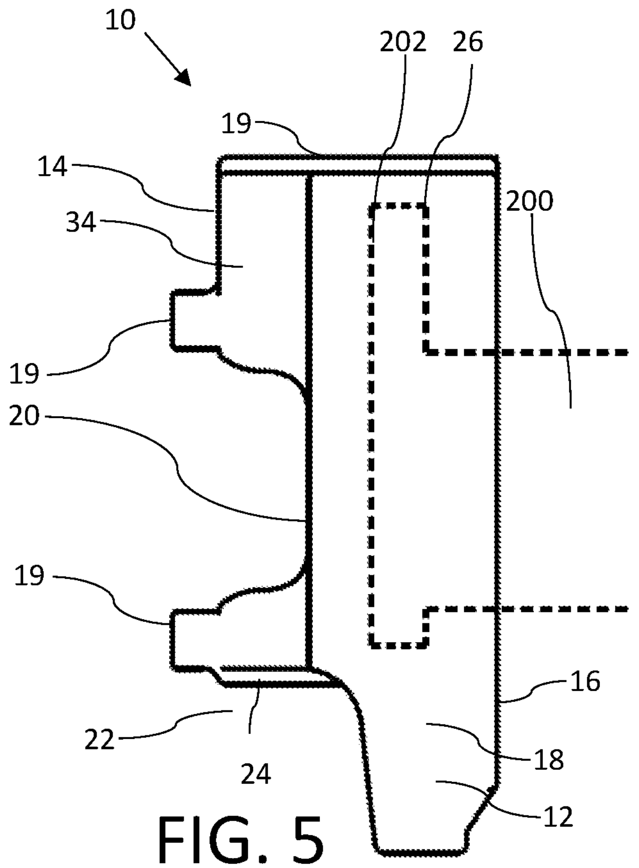
FIG. 5 is a partially transparent side elevation view of an attachment for a nail driving tool.
Figure 6:
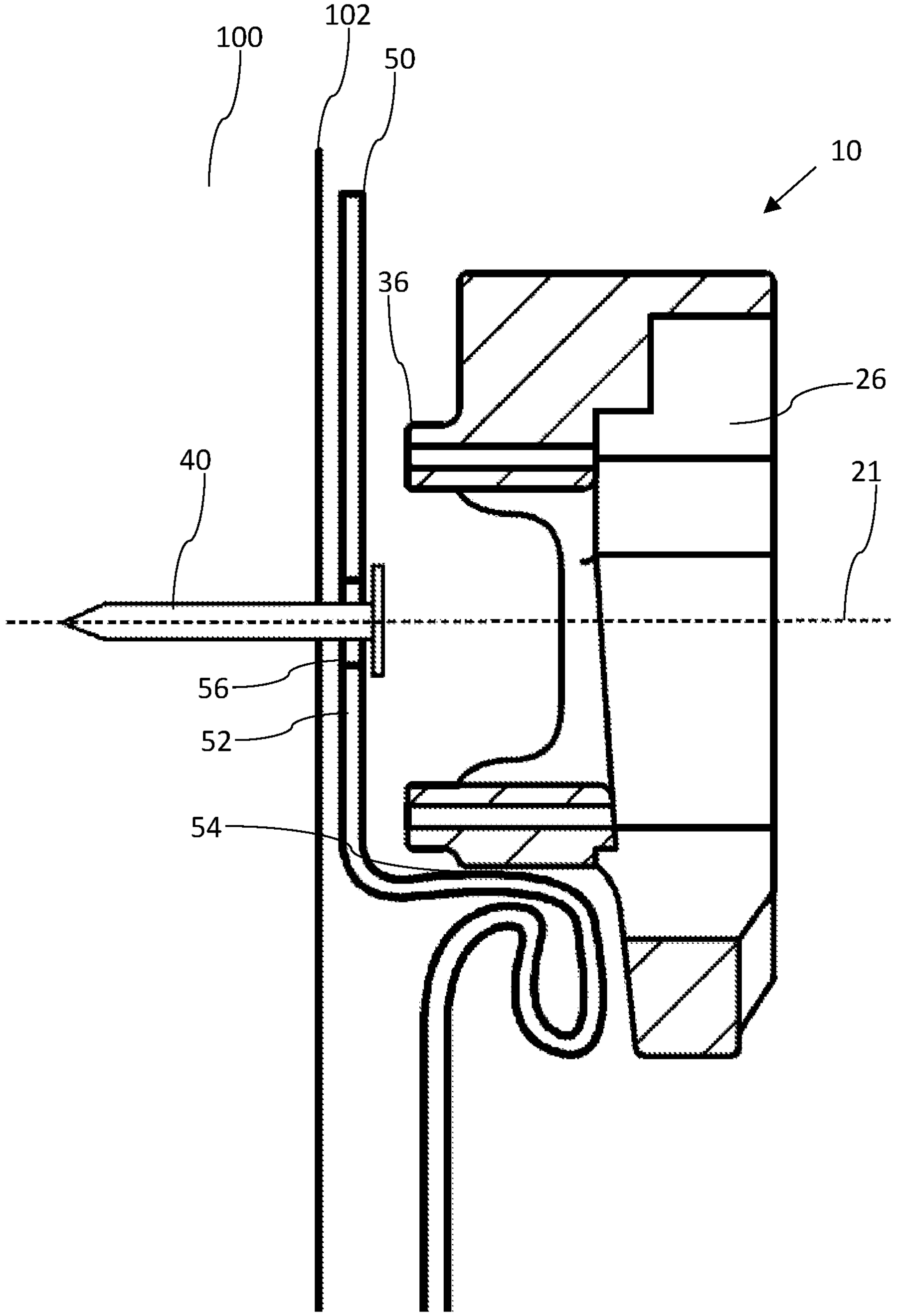
FIG. 6 is a side elevation view in section of an attachment for a nail driving tool engaged with siding.
Figure 7:
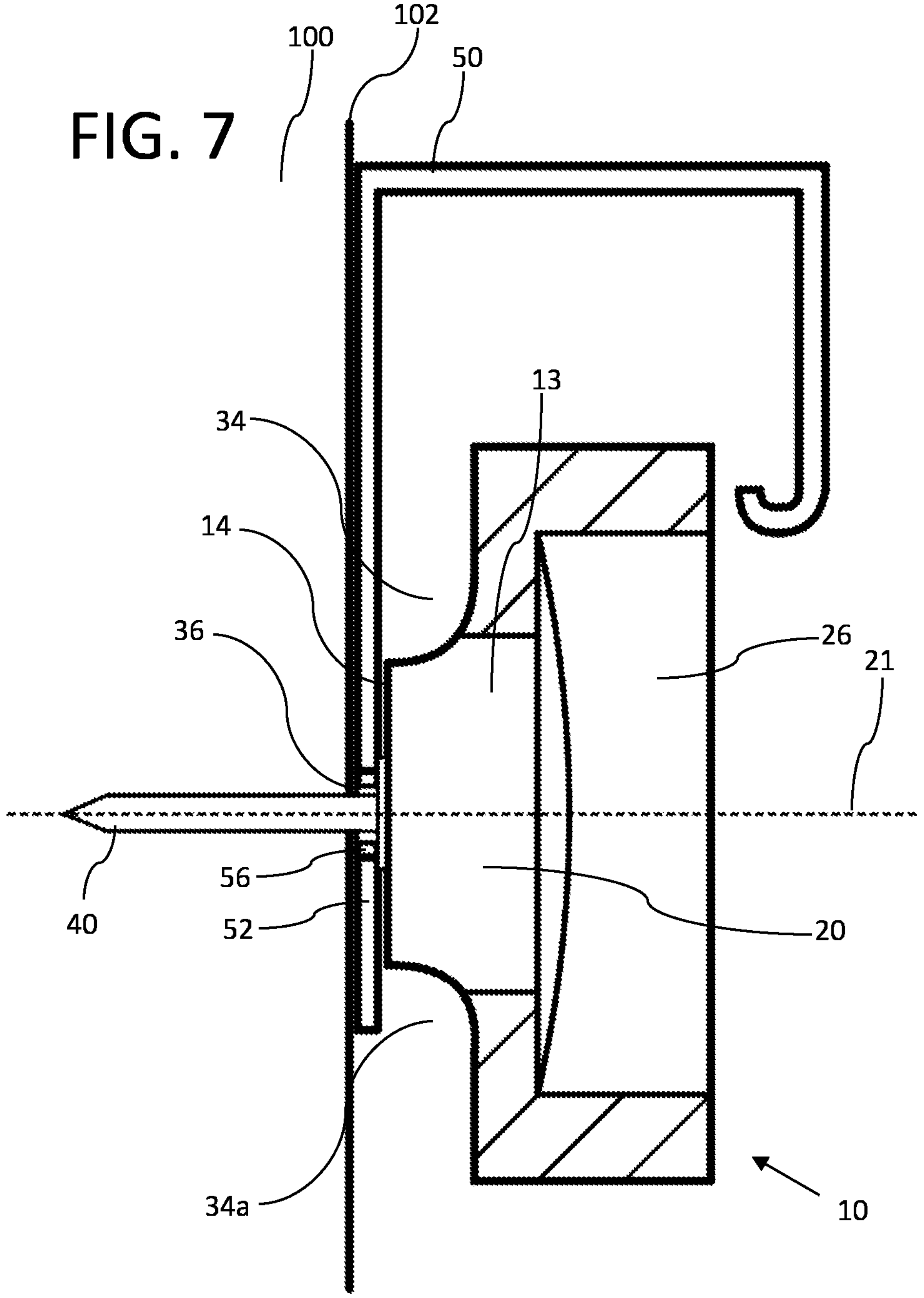
FIG. 7 is a top plan view in section of an attachment for a nail driving tool engaged with J-channel.

A working end for a nail driving tool, generally identified by reference numeral 10, will now be described with reference to FIG. 1 through 10. Working end 10 is used with a nail driving tool, such as an electric or pneumatic nail gun. Working end 10 may be an attachment that is removably attached to an existing structure of nail driving tool or may be permanently attached to a purpose-built nail driving tool for siding. The nails driven by the nail driving tool may take various forms, although nails used with siding panels often have a larger head shape in order to engage with the siding. Referring to FIGS. 6 and 7, working end 10 is designed to be used when installing siding components 50 on a wall 102 of a building 100, and may be used with any type of siding panel 50 that requires nails 40 to be secured to the wall. Typically, working end 10 is most useful for siding panels 50 that are installed in multiple overlapping pieces and has a recessed nailing strip 52, such as the one depicted in FIG. 6. Working end 10 may be used to adapt a nail driving tool that is otherwise ill-equipped to install siding. It will be understood that references to siding components may include a number of difference components installed as a part of siding, such as siding panels, J-channels, or other components known in the art that are secured using fasteners driven through a nailing strip. As will be understood, working end 10 may be designed to accommodate different types of siding components.

Figure 1:
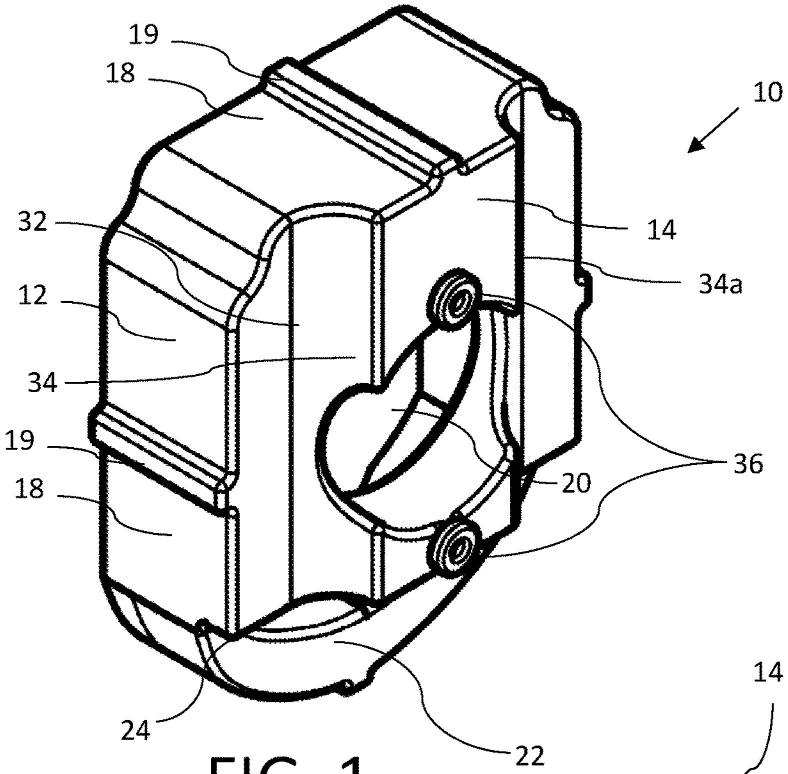
FIG. 1 is a top perspective view of an attachment for a nail driving tool.
Figure 2:
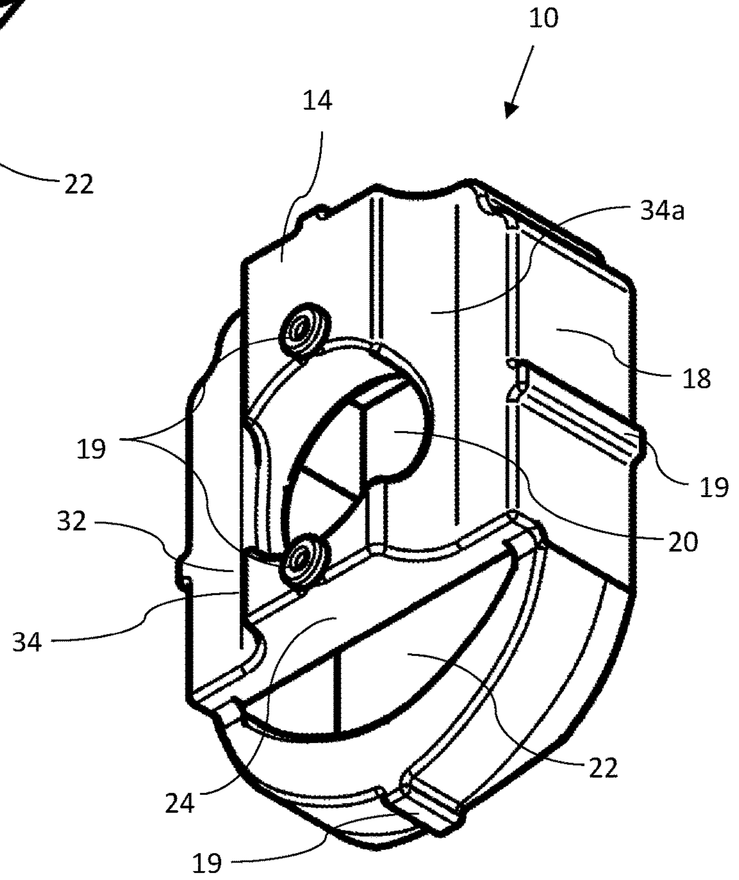
FIG. 2 is a bottom perspective of an attachment for a nail driving tool.
Figure 3:
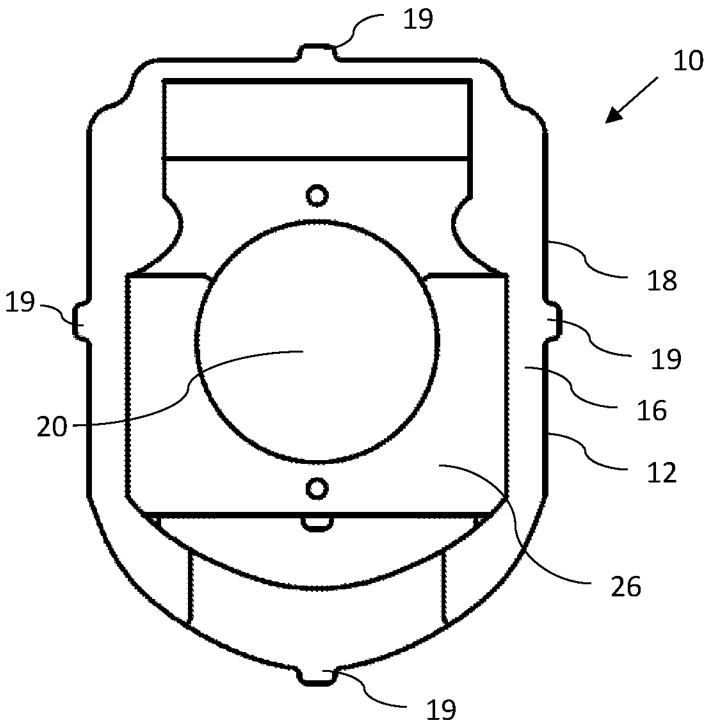
FIG. 3 is a rear plan view of an attachment for a nail driving tool.

Working end 10 has a body 12 with a front end, rear end opposite the front end, and an outer perimeter. Referring to FIGS. 1 and 2, the front end and rear end may be a front end 14 and a rear end 16, respectively, and the outer perimeter may be a sidewall 18 that extends between front end 14 and rear end 16. A nail aperture 20 extends between front end 14 and rear end 16 through body 12. The rear end of body 12 has a connection that secures body 12 to nail driving tool 200. Referring to FIG. 3, the connection may be a receptacle 26 is formed in rear end 16. Referring to FIG. 5, receptacle 26 is sized to receive nail driving tool 200 and align nail driving tool 200 with nail aperture 20 such that, when nail driving tool 200 drives nail 40, nail 40 passes through nail aperture 20. Referring to FIG. 6, nails 40 driven through nail aperture 20 may travel along a chosen axis 21 that corresponds to a trajectory that nail 20 has when it exits nail driving tool 200. As shown, receptacle 26 may be secured to nail driving tool 200 via a friction fit, or an interference fit, and receptacle 26 may be sized for use with a specific model or type of nail driving tool 200. Alternatively, working end 10 may be fixed into place using clamps or set screws (not shown). A thickness of body 12 between front end 14 and rear end 16 may be chosen such that body 12 is capable of fitting partially underneath components of siding 50, such as the "j" extension of J-channel siding, as shown in FIG. 7. Receptacle 26 may have an inner contact surface 15 that controls the depth to which nail driving tool 200 is inserted when received by receptacle 26. Inner contact surface 15 may be spaced a predetermined distance from front end 14 or protrusions 36, as the case may be, to control the depth to which the nail driving tool drives the nail through the siding. In some circumstances, such as when installing siding panels, the nail head may need to sit proud relative to the nailing strip to allow the siding panel to expand and contract in changing temperatures. In other circumstances, the nail head may need to be tight against the siding panel. These differences may be controlled by controlling the space between the nail gun and the surface that receives the nail. This distance may be adjustable, such as by using set screws or other adjustment devices that allows the location of contact surface 15 to be moved in or out, by inserting spacer into receptacle 26, or from the front end such as by adjusting protrusions 36 or providing an overlay. This may not be required if nail driving tool 200 is designed to be adjustable.

Figure 4:
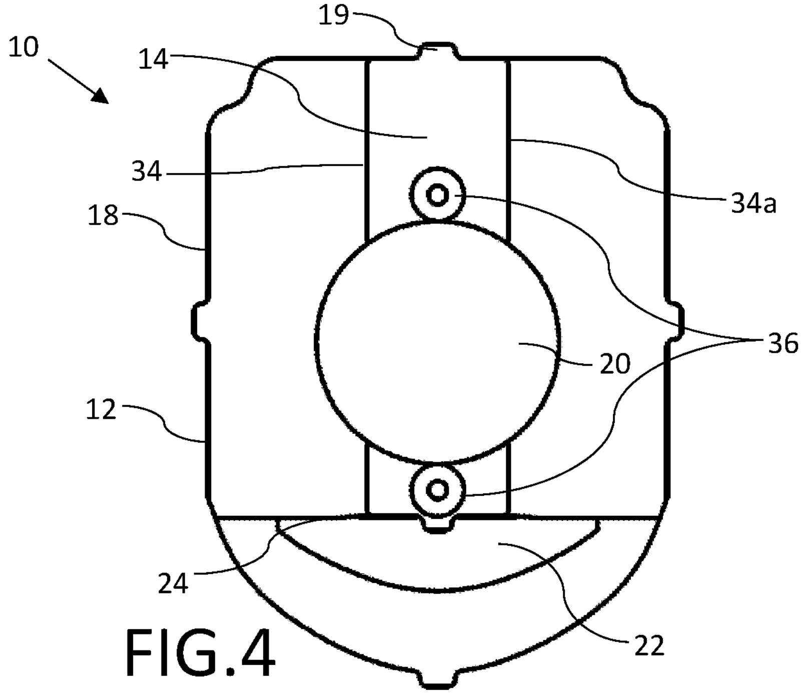
FIG. 4 is a front plan view of an attachment for a nail driving tool.
Figure 8:
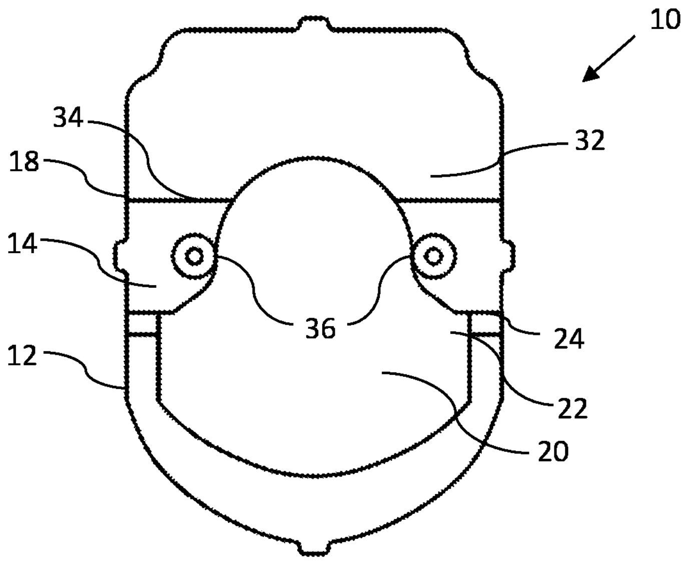
FIG. 8 is a front elevation view of an alternative design of an attachment for a nail driving tool.

Referring to FIG. 4, front end 14 has a recess 22 that forms a first guide 24. Referring to FIG. 8, first guide 24 is configured to align nail aperture 20 with nailing strip 52 of siding panel 50 by engaging a surface 54 on siding panel 50 that is a set distance from nailing strip 52. As such, first guide 24 may be spaced at a first distance from axis 21 to align the trajectory of nail 40 with nailing strip 52. When using working end 10 to install siding panel 50, first guide 24 may be engaged to surface 54 and slid along surface 54 to drive nails at a high rate with high precision. Referring to FIGS. 1 and 2, as depicted, recess 22 is located on a lower portion of front end 14, however it will be understood that recess 22 may be located anywhere on front end 14, and first guide 24 may occur at any position or angle on front end to accommodate different types of siding. For example, if siding has a surface 54 above nailing strip, recess 22 may be located on a top portion of front end 14.

Referring to FIG. 4, a second guide 34 may be formed from a second recess 32 in front end 14. Second guide 34 may have a variety of configurations, some examples of which are described below.

Referring to FIGS. 1 and 2, second guide 34 may be orthogonal to first guide 24, such that second guide 34 engages siding by rotating nail driving tool 200. With second guide 34 in this configuration, second guide 34 may be located a second distance from axis 21 that is different from the first distance of first guide 24. In this configuration, working end 10 and nail driving tool 200 may be held in one orientation to install a first type of siding panel 50, and then rotated to install a second type of siding panel 50 with dimensions that are different than the dimensions of the first type. For example, one orientation may be used to install siding panels, and another orientation may be used to install J-channel siding component. In addition, working end 10 may have a third guide **34*a* that is opposite second guide 34. In the depicted example, third guide 34*a* is similar and symmetric to second guide 34 such that working end 10 may be rotated either clockwise or counter-clockwise to install second type of siding panel 50. Alternatively, third guide 34*a* may be spaced a third distance from axis 21**, to accommodate another type or size of siding.

Figure 9:
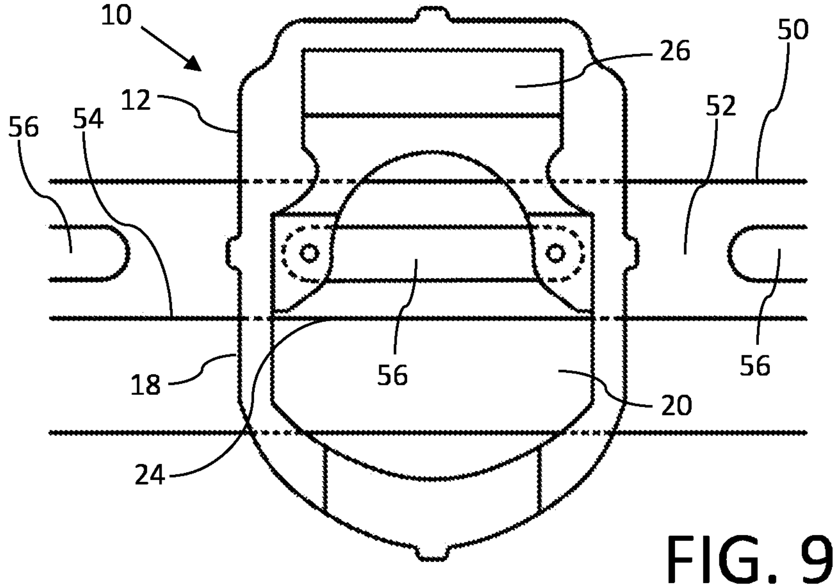
FIG. 9 is a rear elevation view of an alternative design of an attachment for a nail driving tool shown engaged with siding.
Figure 10:
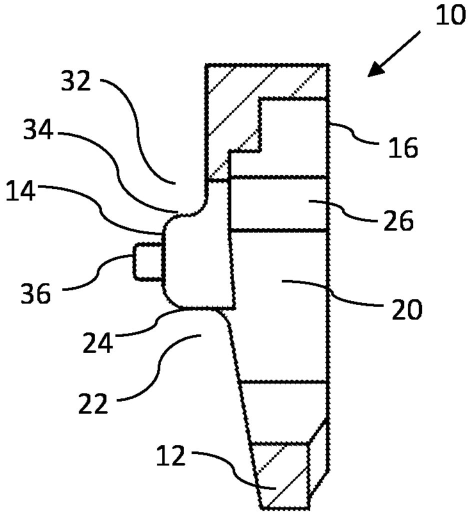
FIG. 10 is a side elevation view in section of an alternative design of an attachment for a nail driving tool.

Referring to FIG. 8 through FIG. 10, second guide 34 may be configured such that it has a parallel relationship with first guide 24. In this case, second guide 34 may work with first guide 24 to align nail aperture 20 with nailing strip 52, or it may be used separately from first guide 24, in order to align nail opening 20 with nailing strip 52 on siding panel 50 with different dimensions. As depicted, first guide 24 and second guide 34 may be parallel in a horizontal direction, such that a nail driving tool 200 can be held in an upright position when installing siding 50 with a horizontal nailing strip. First and second guides 24 and 34 may also be parallel in a vertical direction, to better accommodate siding 50 with a vertical nailing strip 52.

Referring to FIGS. 1 and 2, working end 10 has one or more protrusions 36 on front end 14 that are spaced from nail aperture 20. Protrusions may be spaced along the height of working end 10, as shown in FIGS. 1 and 2, or along the width of working end, as shown in FIGS. 9 and 10. Referring to FIG. 8, one or more protrusions 36 are configured to engage nailing strip 52 and align nail aperture 20 with a nail-receiving aperture 56 of the nailing strip 52. Protrusions 36 may be inserted into nailing strips to align nail aperture 20 with nail-receiving apertures 56 in nailing strip 52. Protrusions 36 may work in conjunction with guide 24 to align nail aperture 20 with nail-receiving apertures 56. In one example, one or more protrusions 36 may be used to install siding panels 50 for which there is no surface 54 to use for alignment. One example may be J-channel siding, in which there may not be a surface 54 that can be used for alignment, however there are nail-receiving apertures 56. Protrusions 36 may be positioned along a line that intersects axis 21 in order to facilitate alignment of nails 40 and may be either equally or unequally spaced from axis 21. As depicted, protrusions 36 are spaced such that they fit into either end of nail-receiving aperture 56, thereby ensuring nail 40 is driven into the center of nail-receiving aperture 56. However, other widths of separation between one or more protrusions may be used, such as a separation that allows protrusions 36 to be engaged to neighbouring nail-receiving apertures 56.

Protrusions 36 may extend outward from front end 14 by an adjustable amount. This may be accomplished by providing screws or bolts attached to protrusions 36 that are threaded into body 12 of working end 10. As protrusions 36 may be more likely to come in contact with various surfaces when working end 10 is being used, protrusions 36 may be made from a harder material than body 12 to reduce wear on working end 10. In one example, body 12 may be moulded from a plastic material, and protrusions 36 are made from metal, and are screwed into body 12 after it has been moulded.

When engaged to surface 54, first guide 24 may be configured to establish a first spacing between front end 14 and nailing strip 52, and second guide 34 may be configured to establish a second spacing between front end 14 and nailing strip 52. When installing siding, it may be preferable to drive nails 40 to different depths, depending on the component of siding 50 being installed. Having a first and second spacing may allow a nail to be driven to different depths depending on which guide is engaged, or it may allow a nail to be driven to the same depth on siding components with different dimensions. This may allow for control of nail depth without having to adjust settings on nail driving tool 200. Driving nails 40, without the use of guides 24 or 34, by allowing protrusions 36 to come into contact with wall 100 or nailing strip, may establish a third spacing in which nail 40 is driven to a maximum depth. This may also be used to drive nails to either sit proud, or to be tight against nailing strips 42.

The various features discussed above may be used in any combination to establish the desired spacing between wall 100 and nail driving tool 200, and drive nails 40 to the desired depth. In the example shown in FIG. 6, first guide 24 maintains a larger spacing by coming into contact with surface 54 compared to the spacing for the example shown in FIG. 7, where it is preferred to minimize the spacing as much as possible, so protrusions 36 are engaged with wall 100. In this manner, working end 10 may be used in different orientations to establish different spacing and, as a result, drive nails 40 to different depths in those orientation. This may remove the need to make any driving depth adjustments to nail driving tool 200 or it may allow for the use of a nail driving tool 200 that does not have any depth adjustment features. In addition to first and second guides 24 and 34 establishing spacing, the thickness of inner portion 13 of body 12, adjustment of contact point 15, and adjustment of protrusions 36 may contribute to adapting working end 10 for the installation of various siding components.

Sidewall 18 may have a plurality of visual guides 19 that are positioned to align the nail aperture 20 with nail-receiving aperture 56 of nailing strip 52. As shown, working end 10 has two pairs of visual guides 19 that are small bumps on sidewall 18, although visual guides may also be indentations, markings, etc. Each pair of visual guides 19 may be located on a line that intersects with axis 21, such that visual guides 19 help an operator align nails 40 in whichever orientation the working end 10 is being used.

A method of installing siding panels 50 using working end 10, as described above, with a nail driving tool 200 will now be described.

Nail driving tool 200 may be inserted into receptacle 26 of rear surface 16. Force may need to be applied to working end 10 in order to establish an interference or friction fit on nail driving tool 200. With siding panel 50 held against wall 102 of building 100, first guide 24 is used to align nail aperture 20 with nailing strip 52 of siding panel 50. Guide 24 may be engaged with a surface 54 adjacent to nailing strip 52 on siding panel 50 to align nail aperture 20.

One or more protrusions 36 are used to engage nailing strip 52 and align nail aperture 20 with nail-receiving aperture 56 of nailing strip 52. It will be understood that protrusions 36 may be used in addition to first guide 24 to align nail aperture 20, or protrusions 36 and first guide 24 may be used independently of one another to install different types of siding panel 50. If working end 10 has a second guide 34, second guide 34 may be used to align nail aperture 20, either with, or independently of protrusions 36. Once nail aperture 20 has been aligned with nailing strip 52, nail driving tool 200 is used to drive one or more nails 40 through nail aperture 20 and into nailing strip 52. Using first guide 24 to align nail aperture 20 may include engaging first guide 24 with surface 54 and sliding first guide 24 along surface 54 while driving nails 40 at desired intervals to rapidly drive nails 40 through nailing strip 52 and secure siding panel 50 to wall 102.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A working end for a nail driving tool for use in installing a siding component having a nailing strip comprising a series of nail-receiving slots, the working end comprising:

a body having a front end, a rear end opposite the front end, an outer perimeter between the front end and the rear end, and a nail aperture between the front end and the rear end, wherein the rear end comprises a connection that secures the body to the nail driving tool and aligns the nail aperture with the nail driving tool, the nail aperture defining an axis along which a nail driven by the nail driving tool travels;

a first guide formed by a recess in the front end that is configured to align the nail aperture with the nailing strip when engaged with a surface of the siding component that is a set distance from the nailing strip; and one or more protrusions extending outward from the front end and spaced from the nail aperture, the one or more protrusions being configured to be received within a selected nail-receiving slot of the nailing strip and align the nail aperture with the selected nail-receiving slot, wherein:

the one or more protrusions and the axis are intersected by a line that is perpendicular to the axis.

2. The working end of claim 1, wherein the front end has a second guide formed by a second recess in the front end, the second guide being parallel to the first guide and being positioned opposite the first guide relative to the axis.

3. The working end of claim 2, wherein:

the first guide is located at a first distance from the axis, and the second guide is located at a second distance from the axis that is different than the first distance.

4. The working end of claim 2, wherein:

the first guide is configured to establish a first spacing between the front end of the body and the nailing strip when engaged with the surface of the siding component; and the second guide is configured to establish a second spacing between the front end of the body and the nailing strip when engaged with the surface of the siding component.

5. The working end of claim 2, wherein the recess and the second recess are recessed to a different depth.

6. The working end of claim 1, wherein:

the one or more protrusions comprise first and second protrusions that are positioned along the line that intersects the axis.

7. The working end of claim 1, wherein a distance that the one or more protrusions extend outward from the front end is adjustable.

8. The working end of claim 1, wherein the connection comprises a receptacle formed in the rear end of the body, a depth of the receptacle being adjustable relative to the rear end.

9. The working end of claim 1, wherein the rear end comprises a receptacle that engages the nail driving tool using a friction fit or an interference fit.

10. The working end of claim 1, wherein a thickness of the body along the outer perimeter is sized to fit within a channel of a J-channel siding element.

11. The working end of claim 1, further comprising visual guides on the outer perimeter that are positioned to align the nail aperture with the nail-receiving aperture of the nailing strip.

12. The working end of claim 1, wherein the one or more protrusions comprise metal pins, and the body is made from a polymer.

13. A method of installing a siding component on a building, the method comprising the steps of:

providing a working end on a nail driving tool, the working end comprising:

a body having a front end, a rear end opposite the front end, an outer perimeter between the front end and the rear end, and a nail aperture between the front end and the rear end that is aligned with the nail driving tool, the rear end comprising a connection that secures the body to the nail driving tool, the nail aperture defining an axis along which a nail driven by the nail driving tool travels;

a first guide formed by a recess in the front end; and a first protrusion and a second protrusion extending outward from the front end on opposite sides of the nail aperture, the first protrusion, the second protrusion, and the axis being intersected by a line that is perpendicular to the axis;

using the first guide to align the nail aperture with a nailing strip of a siding component;

inserting the first protrusion and the second protrusion into a nail-receiving slot of the nailing strip such that the axis of the nail aperture is aligned with the nail-receiving slot of the nailing strip; and using the nail driving tool, securing the siding to the building by driving a nail through the nail aperture and into the nail-receiving slot.

14. The method of claim 13, wherein the front end has a second guide formed by a second recess in the front end, the second guide being parallel to the first guide and being positioned opposite the first guide relative to the axis.

15. The method of claim 14, wherein:

the first guide is located at a first distance from the axis, and the second guide is located at a second distance from the axis that is different than the first distance.

16. The method of claim 14, wherein:

the first guide is configured to establish a first spacing between the front end of the body and the nailing strip when engaged with a surface of the siding component; and the second guide is configured to establish a second spacing between the front end of the body and the nailing strip when engaged with the surface of the siding component.

17. The method of claim 14, wherein the recess and the second recess are recessed to a different depth.

18. The method of claim 13, wherein a distance that the first protrusion and the second protrusion extend outward from the front end is adjustable.

19. The method of claim 13, wherein the connection comprises a receptacle formed in the rear end of the body, a depth of the receptacle being adjustable relative to the rear end of the body; and the step of aligning the nail aperture with the nail driving tool comprises inserting the nail-driving tool into the receptacle.

20. The method of claim 13, wherein the connection comprises a receptacle that engages the nail driving tool using a friction fit or an interference fit.

21. The method of claim 13, wherein a thickness of the body along the outer perimeter is sized to fit within a channel of a J-channel siding element.

22. The method of claim 13, wherein the body further comprises visual guides on the outer perimeter that are positioned to align the nail aperture with the nail-receiving aperture of the nailing strip.

23. The method of claim 13, wherein the first protrusion and the second protrusion comprise metal pins, and the body is made from a polymer.

* * * * *